United States Patent [19]

Kaji

[11] Patent Number: 5,268,839
[45] Date of Patent: Dec. 7, 1993

[54] TRANSLATION METHOD AND SYSTEM FOR COMMUNICATION BETWEEN SPEAKERS OF DIFFERENT LANGUAGES

[75] Inventor: Hiroyuki Kaji, Tama, Japan
[73] Assignee: Hitachi, Ltd., Tokyo, Japan
[21] Appl. No.: 673,023
[22] Filed: Mar. 21, 1991

[30] Foreign Application Priority Data

Mar. 27, 1990 [JP] Japan .................. 2-78529

[51] Int. Cl.⁵ .................. G06F 15/38; G06G 7/60
[52] U.S. Cl. .................. 364/419.03
[58] Field of Search .................. 364/419

[56] References Cited

U.S. PATENT DOCUMENTS

| | | | |
|---|---|---|---|
| 4,641,264 | 2/1987 | Nitta et al. | 364/900 |
| 4,821,230 | 4/1989 | Kumano et al. | 364/900 |
| 4,882,681 | 11/1989 | Brotz | 364/419 |

FOREIGN PATENT DOCUMENTS 58-40684 9/1981 Japan.
61-40671 7/1984 Japan.
01147774 12/1987 Japan.
01251276 3/1988 Japan.

Primary Examiner—Roy N. Envall, Jr.
Assistant Examiner—Ari M. Bai
Attorney, Agent, or Firm—Fay, Sharpe, Beall, Fagan, Minnich & McKee

[57] ABSTRACT

In a communication system in which translation is achieved in a bidirectional manner between a first language terminal and a second language terminal, words appearing in sentences inputted from the first-language terminal are memorized so that the memorized words are preferentially selected when determining equivalents in later translations of sentences inputted from the second-language terminal, and vice versa. As means for memorizing an occurring word, a sentence number assigned to an input sentence containing the word may be stored in a word dictionary as activation degree information of the word or an occurring word file may be disposed for sequentially storing therein the occurring word. These items may be stored in combination with terminal user IDs. Various types of function allocation methods are possible. For instance, an input sentence can be analyzed by an input terminal so as to send the analyzed information to a destination terminal, which then generates a translated sentence from the received information a translated sentence obtained by a terminal of an input side can be sent to a terminal of a destination side.

23 Claims, 13 Drawing Sheets

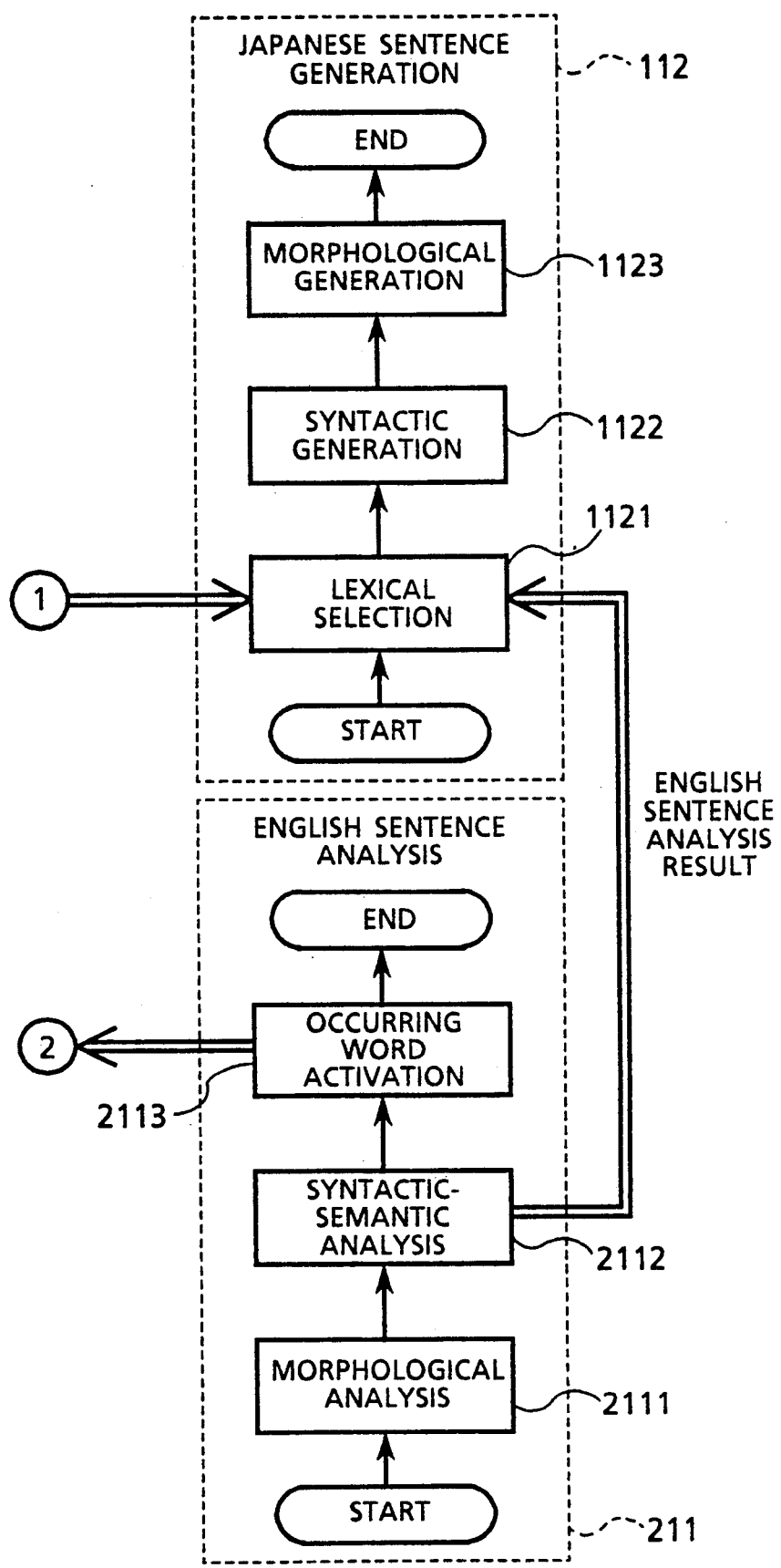

FIG. 3A
JAPANESE WORD DICTIONARY

| JAPANESE ENTRY WORD | PART OF SPEECH (1) | SEMANTIC CODE (1) | SENTENCE PATTERN (1) | ... | PART OF SPEECH (m) | SEMANTIC CODE (m) | SENTENCE PATTERN (m) | ACTIVATION DEGREE INFORMATION |
|---|---|---|---|---|---|---|---|---|
| 1211 | 1212 | 1213 | 1214 | | | | | 1215 |

FIG. 3B
ENGLISH-JAPANESE TRANSFER DICTIONARY

| ENGLISH ENTRY WORD | JAPANESE EQUIVALENT (1) | ... | JAPANESE EQUIVALENT (n) |
|---|---|---|---|
| 1221 | 1222 | | |

FIG. 3C
ENGLISH WORD DICTIONARY

| ENGLISH ENTRY WORD | PART OF SPEECH (1) | SEMANTIC CODE (1) | SENTENCE PATTERN (1) | ... | PART OF SPEECH (m) | SEMANTIC CODE (m) | SENTENCE PATTERN (m) | ACTIVATION DEGREE INFORMATION |
|---|---|---|---|---|---|---|---|---|
| 2211 | 2212 | 2213 | 2214 | | | | | 2215 |

FIG. 3D
JAPANESE-ENGLISH TRANSFER DICTIONARY

| JAPANESE ENTRY WORD | ENGLISH EQUIVALENT (1) | ... | ENGLISH EQUIVALENT (n) |
|---|---|---|---|
| 2221 | 2222 | | |

FIG. 5A

ACTIVATION DEGREE INFORMATION IN JAPANESE WORD DICTIONARY

| 1ST USER ID (1) | 2ND USER ID (1) | ACTIVATION DEGREE INFORMATION (1) | ... | 1ST USER ID (l) | 2ND USER ID (l) | ACTIVATION DEGREE INFORMATION (l) |
|---|---|---|---|---|---|---|
| 12151 | 12152 | 12153 | | | | |

FIG. 5B

ACTIVATION DEGREE INFORMATION IN ENGLISH WORD DICTIONARY

| 1ST USER ID (1) | 2ND USER ID (1) | ACTIVATION DEGREE INFORMATION (1) | ... | 1ST USER ID (l) | 2ND USER ID (l) | ACTIVATION DEGREE INFORMATION (l) |
|---|---|---|---|---|---|---|
| 22151 | 22152 | 22153 | | | | |

ACTIVATION DEGREE INFORMATION IN ENGLISH WORD DICTIONARY

TRANSLATION METHOD AND SYSTEM FOR COMMUNICATION BETWEEN SPEAKERS OF DIFFERENT LANGUAGES

BACKGROUND OF THE INVENTION

The present invention relates to a translation method for communication between speakers of different languages and to a system implementing the same wherein speakers using different languages can communicate with each other through translation means of the respective languages combined to communication means such as telephone sets or electronic mail.

Heretofore, there have been proposed automatic translation methods in which translation of a sentence expressed in a natural language into another natural language is achieved by an apparatus such as a computer. For example, according to an automatic translation method described in an article of Nitta et al. "U.S. Pat. No. 4,641,264 dated Feb. 3, 1987 entitled "Method For Automatic Translation Between Natural Languages" (U.S. patent application Ser. No. 415,601) and assigned to the same assignee with the present application (corresponding to JP-A-58-40684) operations for the translation such as a syntactic analysis are accomplished by a computer to translate a sentence of a first language into a second language. In accordance with the method above, the translation is conducted in a one-directional procedure, namely, from the first language to the second language.

A bi-directional translation procedure is achieved, for example, in a communication system with translating function described in the JP-A-1-147774. In this system, a recognition result of inputted speech is translated into a language of a communicating partner and then a translated sentence is processed so as to synthesize speech in a method such as a synthesis by rule, thereby sending the obtained speech to the partner. Namely, the system includes a combination of an automatic translation from a first language into a second language and an automatic translation from the second language into the first language, which allows speakers respectively of the first and second languages to conduct voice communications in their own languages.

However, (1) since the automatic translation technology has not been completely developed, the translations cannot be of a satisfactory quality. Among various difficulties of the quality of translation, lexical selection is regarded as a fundamental problem.

That is, a wrong lexical selection frequently occurs because of misjudgment of a word with multiple meanings in a sentence.

For example, an English word "bank" to be interpreted as a Japanese equivalent "teibo" is erroneously translated as a Japanese word "ginko". (2) Terminological inconsistency is another problem which is caused in a communicating system with translating function including the automatic translation from the first language into the second language and the automatic translation from the second language into the first language. Namely, a word representing a concept may possibly be changed through the translations in the respective directions.

For example, a Japanese word "teibo" from a Japanese speaker is interpreted as an English equivalent "bank" through a Japanese-English translation. Thereafter, in association with a sentence including the word "bank", when an English speaker sends a sentence containing the word "bank", the system may translate the word "bank" into a Japanese equivalent "dote" through an English-Japanese translation. Due to occurrences of the mistranslation and the terminological inconsistency, the communication systems with translating function above are attended with the problems when put to practical uses.

In order to solve the problems above, the JP-A-1-251276 has disclosed a communication system with translating function developing a bi-directional translation. In this system, there are stored pairs of words or equivalents attained in a process of translation from a first language into a second language i.e. translation relationships between words of the first language and their equivalents in the second language. When translating a sentence in a reverse direction, namely, in a translation of a sentence expressed in the second language into the first language, the translation relationships thus stored are referenced to select equivalents in the second language for the words of the first language sentence. In short, the publication of this technology has proposed operations and constitutions associated therewith in which the translation relationships collected through a translation procedure in a direction are employed when a translation is achieved in a reverse direction. However, it has a defect that the translation relationships collected through a translation procedure are not always appropriate for translation in the reverse direction. Assume that a first language word A is mistranslated into a second language word X and a second language speaker uses a word Y to express the same concept as that of A. The collected translation relationship (A, X) will be useless for translation in the reverse direction. Though the desirable relationship is (A, Y), it cannot been collected.

SUMMARY OF THE INVENTION

It is therefore a general object of the present invention to provide an improvement of a translation method for communication between speakers of different languages and a translation system implementing the same wherein conventional problems (1) and (2) above are solved such that an appropriate equivalent is selected at a high probability and terms are used in a consistent manner between a transmitted sentence and a received sentence.

A basic object according to the present invention is to provide a translation method for communication between speakers of different languages and a translation system implementing the same wherein, in a translation of a sentence expressed in a language of a sender into another language used by a receiver, words beforehand adopted by the receiver are preferentially selected as equivalents so as to develop a high-quality translation. As a consequence, another object of the present invention is to provide a translation method and a translation system implementing the same wherein, without necessitating processing procedures to store and to reference the translation relationships between different languages as above, the translation is accomplished through a simplified processing procedure so as to increase the translation quality and fidelity with respect to the language used by the receiver.

Still another object of the present invention is to provide a translation method for communication between speakers of different languages and a translation system implementing the same in which between an input/output terminal of a first language and an input/output terminal of a second language, a sentence supplied from the first-language terminal is translated into the second language so as to be sent to the second-language terminal wherein functions are optimally allocated to the terminals to improve the system reliability and to reduce the system cost.

According to one aspect of the present invention, there is provided a translation method for communication between speakers of different languages wherein a terminal of a speaker of a first language is connected to a terminal of a speaker of a second language for a communication therebetween including a first step of reading in a sentence represented in the first language to the terminal of the first-language speaker, a second step of translating the first-language sentence into the second language, a third step of outputting the translated sentence of the second language from the terminal of the speaker of the second language, a fourth step of reading in a sentence of the second language to the second-language speaker's terminal, a fifth step of translating the sentence of the second language into the first language, and a sixth step of outputting the translated sentence of the first language from the terminal of the speaker of the first language. In the second step, when determining equivalents in the second language for words expressed in the first language, words appearing in the sentence read in the fourth step are preferentially selected.

According to another aspect of the present invention, there is provided a communication system with translating function wherein when communicating language information between a first terminal for inputting and for outputting information of a first language and a second terminal for inputting and for outputting information of a second language, input sentences through said first and second terminals are respectively translated into the second and first languages respectively associated with said second and first terminals so as to be respectively transmitted thereto comprising first input means disposed in said first terminal for inputting therein information of the first language, second input means disposed in said second terminal for inputting therein information of the second language, first translation means for translating an input sentence of the first language into information of the second language, second translation means for translating an input sentence of the second language into information of the first language, first lexical selection means operative when determining an equivalent in the second language in a translation by said first translation means for preferentially selecting words supplied from said second input means, second lexical selection means operative when determining an equivalent in the first language in a translation by said second translation means for preferentially selecting words supplied from said first input means, transmission means for transmitting information between said first and second terminals, second-language information output means disposed in said second terminal for outputting a result of translation obtained by said first translation means, and first-language information output means disposed in said first terminal for outputting a result of translation obtained by said second translation means.

According to the present invention, in a communication system between different languages in which as well as translation of information of a first language into information of a second language, translation of information of the second language into information of the first language is accomplished, there is at least disposed processing in which words appearing in the input information of the second language are preferentially selected in the translation from the first language into the second language. The translation processing from the second language into the first language may include processing for preferentially selecting words found in the input information of the first language. Namely, the words and/or terms originally adopted by the speaker of the second language are also employed in the translation from the first language into the second language, thereby preventing the mistranslation and the terminological inconsistency.

In the translation processing from the first language into the second language, in order to preferentially select words appearing in the input information of the second language there is disposed, according to an example of the present invention, a (second) occurring word activation subroutine for activating a word found in the input information of the second language, thereby achieving the lexical selection based on the activated word.

For example, in a case where a speaker X of Japanese language expresses a concept e.g. with a Japanese word "teibo", the concept is interpreted e.g. as an English word "bank" through the translation from Japanese into English. At the same time, the Japanese word is activated with respect to the concept so as to supply information of activation degree to the translation processing from English into Japanese.

In response to a reception of a sentence from the speaker X of Japanese language, when a speaker Y of English language inputs a sentence containing the word "bank", the translation processing from English into Japanese accesses a list of equivalent candidates for the word "bank" i.e. a list of Japanese words "teibo", "dote", and "ginko" in which "teibo" is beforehand activated depending on the activation degree information so as to finally select the word "teibo" as the equivalent of the English word "bank". Since the Japanese word "teibo" has already been used by the Japanese language speaker X, the translation is free from the mistranslation and the terminilogical inconsistency, thereby accomplishing a smooth communication between the users of two different languages.

In accordance with the present invention, an optimal allocation of functions are conducted between the first and second terminals for inputting and for outputting the first and second languages, respectively. Consequently, according to an embodiment of the present invention, a first language analysis means disposed in the first terminal analyzes input information of the first language to send a result of the analysis to the second terminal, which in turn translates the received result by second language generation means disposed therein to generate an output of the translation. The second language analysis means of the second terminal analyzes input information of the second language to transmit a result of the analysis to the first terminal such that the first language generation means of the first terminal translates the received result to generate an output of the translation. As a consequence, dictionary means can be advantageously shared between the language analysis means and the language generation means.

BRIEF DESCRIPTION OF THE DRAWINGS

The foregoing and other objects, advantages, manner of operation and novel features of the present invention will be understood from the following detailed description when read in connection with the accompanying drawings wherein:

FIGS. 2A and 2B are flowcharts showing the operation achieved by the system of FIG. 1;

FIGS. 3A to 3D are schematic diagrams respectively showing structures of a Japanese word dictionary, an English-Japanese transfer dictionary, an English word dictionary, and a Japanese-English transfer dictionary of FIG. 1;

FIGS. 5A, 5B, 5A-1, and 5B-1 are diagrams illustratively showing record formats of activation degree information in a case where communications are achieved between arbitrary users in further alternative embodiments according to the present invention;

DESCRIPTION OF THE PREFERRED EMBODIMENTS

Figure 1:
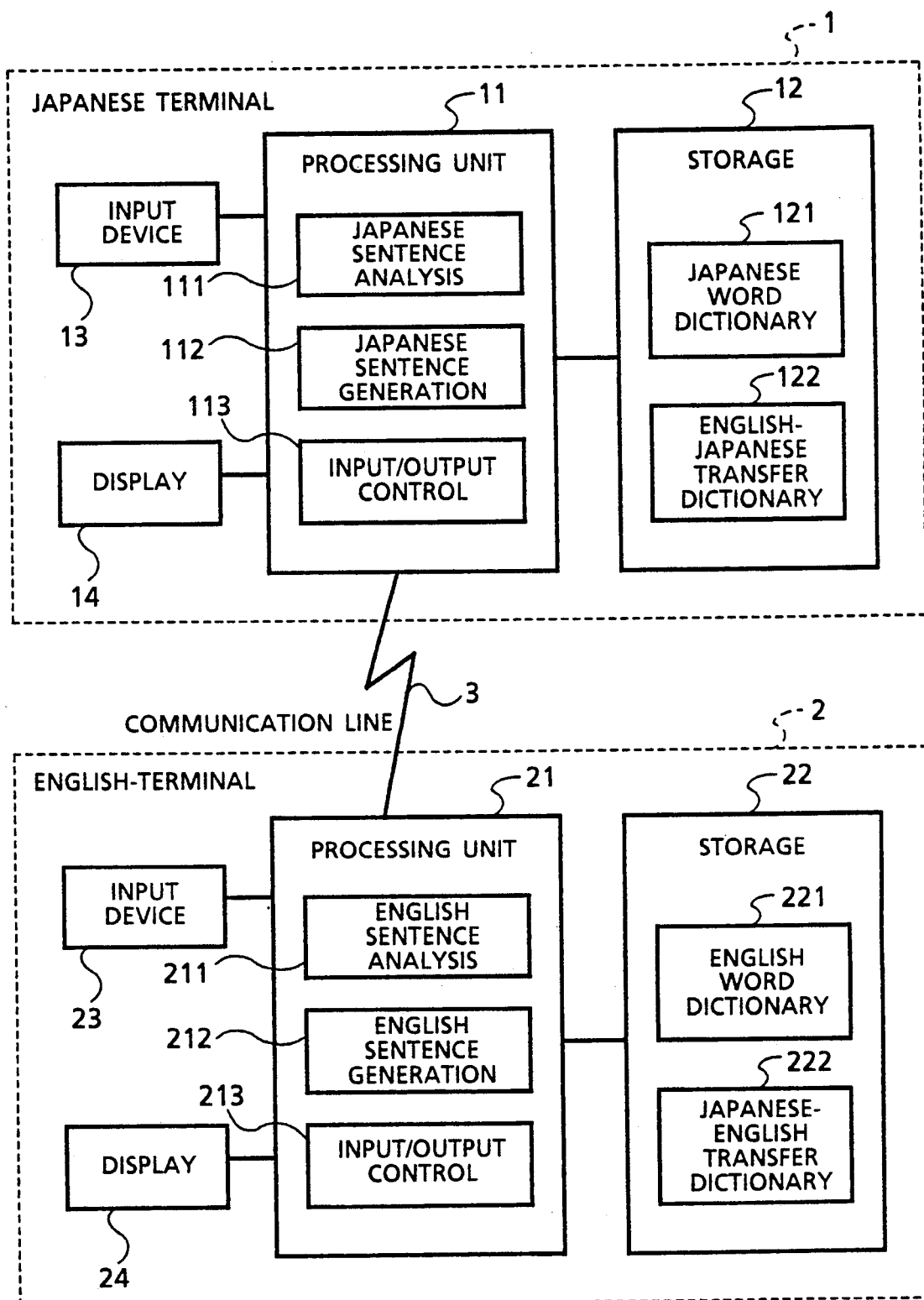
FIG. 1 is a block diagram showing the overall constitution of a Japanese-English communication system in an embodiment according to the present invention.

FIG. 1 shows the overall constitution of a translation system for communication between speakers of different languages according to the present invention. A description will be here given of a case of a translation system for communication between speakers of Japanese and English, respectively. The configuration of FIG. 1 includes a Japanese-terminal, an English-terminal 2, and input devices 13 and 23 respectively for inputting Japanese and English sentences, displays 14 and 24 respectively for presenting Japanese and English sentences, processing units 11 and 21 each for executing processing of a sentence analysis, a sentence generation, and an input/output control, and storages 12 and 22 each for storing therein dictionaries. The processing units 11 and 21 are linked with each other via a communication line 3.

The processing unit 11 of the Japanese-terminal includes a Japanese sentence analysis module 111, a Japanese sentence generation module 112, and an input/output control module 113. This unit 11 achieves the translation by executing these software function modules. A Japanese word dictionary 121 containing Japanese entry words, parts of speech, semantic codes, sentence patterns, activation degree information, etc. and an English-Japanese transfer dictionary 122 containing English entry words and Japanese equivalents associated therewith are stored in the storage 12 of the Japanese-terminal 1.

Similarly, the processing unit 21 of the English terminal comprises an English sentence analysis module 211, an English sentence generation module 212, and an input/output control module 213 such that the translation is performed through execution of these software function modules. Moreover, there are stored in the storage 22 of the English-terminal 2 an English word dictionary 221 containing English entry words, parts of speech, semantic codes, sentence patterns, activation degree information, etc. and a Japanese-English transfer dictionary 222 containing Japanese entry words and English equivalents corresponding thereto.

Next, a description will be given of the structure of the dictionaries of FIG. 1.

FIGS. 3A to 3D show structures of the Japanese word dictionary 121, the English-Japanese transfer dictionary 122, the English word dictionary 221, and the Japanese-English transfer dictionary 222, respectively.

The Japanese word dictionary 121 of FIG. 3A includes at least a set of information items such as a Japanese entry word 1211, a part of speech 1212 necessary for the sentence analysis and generation, a semantic code 1213, and a sentence pattern 1214. In addition, there is also contained an item as information characteristic to the present invention, namely, activation degree information 1215 denoting a point of time when the pertinent word appeared last in the sentences supplied to the Japanese-terminal 1.

The English-Japanese transfer dictionary 122 of FIG. 3B is constituted with records each including a set of an English entry word 1221 and at least one Japanese equivalent 1222 thereof.

The English word dictionary 221 of FIG. 3C has the same structure as the Japanese word dictionary 121 and includes records each comprising an English entry word 2211, a part of speech 2212, a semantic code 2213, a sentence pattern 2214, and activation degree information 2215.

The Japanese-English transfer dictionary 222 of FIG. 3D comprises, like the English-Japanese transfer dictionary 122 of FIG. 3B, records each including a set of a Japanese entry word 2221 and at least one English equivalent 2222 thereof.

Subsequently, a description will be given of the overall operation of the Japanese-terminal 1 of FIG. 1. In this regard, since the operation of the English-terminal 2 is almost completely identical to that of the Japanese-terminal 1, a redundant description of the English-terminal 2 will be here avoided.

When a sentence expressed in Japanese to be sent to a communicating partner is supplied from the input device 13 of the Japanese-terminal 1, the input/output control module 113 assigns a sentence number thereto and then initiates an execution of the Japanese sentence analysis module 111. This module 111 analyzes the inputted Japanese sentence by referencing the Japanese word dictionary 121 to produce a result of the Japanese sentence analysis. At the same time, the Japanese sentence analysis module 111 updates activation degree information of words found in the Japanese sentence. On receiving a processing termination from the Japanese sentence analysis module 111, the input/output control module 113 transmits the Japanese sentence analysis result via the communication line 3 to the English-terminal 2.

Incidentally, although the Japanese-terminal 1 sends here the result of the Japanese sentence analysis to the English-terminal 2, it may also be possible to transmit the inputted Japanese sentence directly thereto, which will be described later in conjunction with another embodiment of the present invention.

Moreover, the Japanese-terminal 1 thereafter receives an English sentence analysis result from the English-terminal 2 via the communication line 3. On receiving the result, the input/output control module 113 initiates the Japanese sentence generation module 112.

Through an execution of this module 112, the English-Japanese transfer dictionary 122 and the Japanese word dictionary 121 are referenced in a process of the processing of the module 112 to create a Japanese sentence based on the English sentence analysis result. The Japanese sentence generation module 112 notifies termination of the processing to the input/output control module 113. In response thereto, the control module 113 presents the obtained Japanese sentence on the display 14. As a result, the Japanese speaker can read the Japanese sentence displayed on the screen as a response from the English-speaking partner.

Figure 2A:
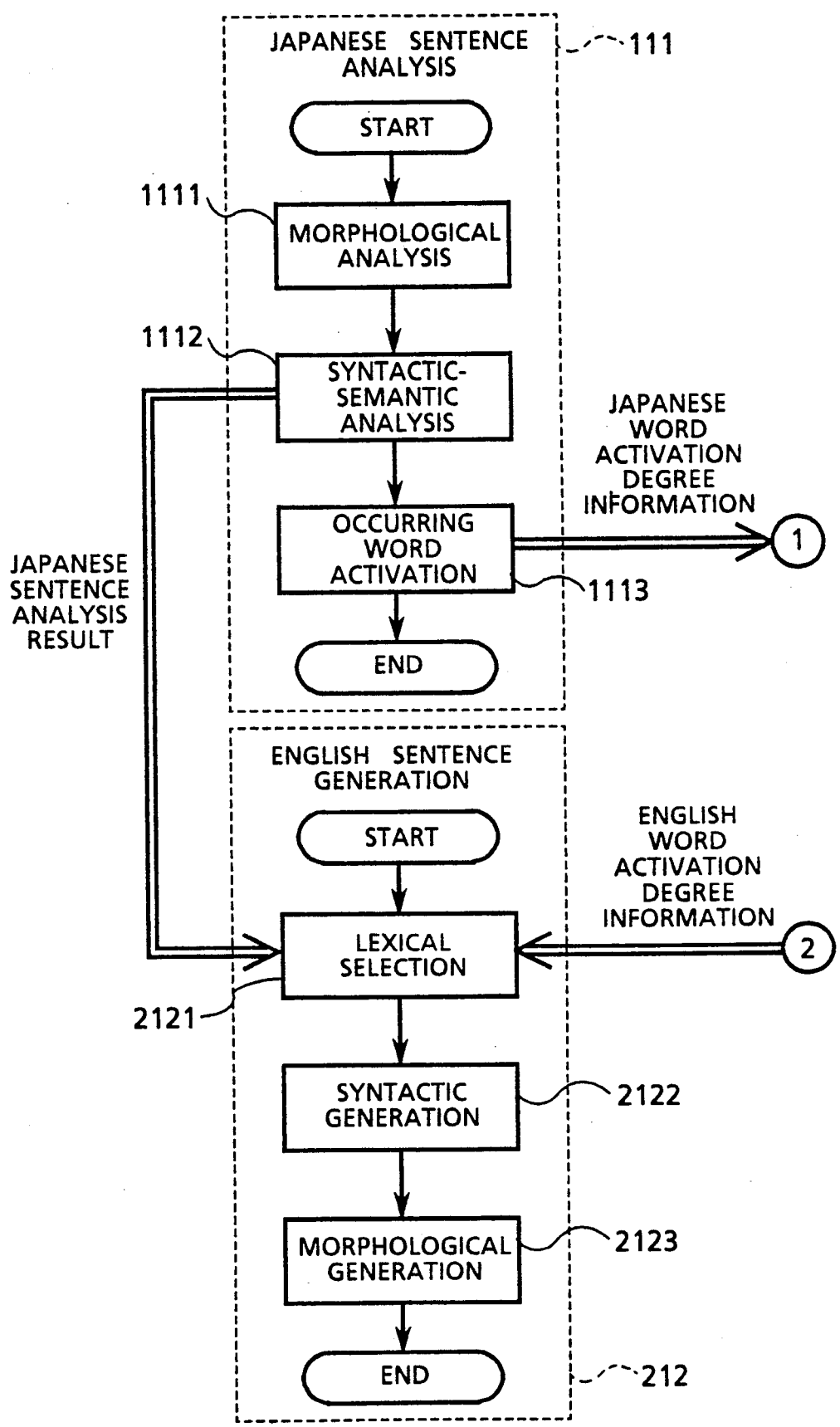

FIGS. 2A and 2B are flowcharts of the operation steps achieved in the processing units 11 and 21 of FIG. 1.

The flowchart includes processing flows associated with and information to be communicated between the Japanese sentence analysis module 111, the English sentence generation module 212, the English sentence analysis module 211, and the Japanese sentence generation module 112.

The Japanese sentence analysis module 111 is constituted with a morphological analysis subroutine 1111, a syntactic-semantic analysis subroutine, and an occurring word activation subroutine 1113.

The morphological analysis subroutine 1111 segments a Japanese sentence into words while achieving a word retrieval through the Japanese word dictionary 121 to determine a part of speech for each word. Namely, for this purpose, while segmenting the sentence into words, the subroutine 1111 need only reference a part of speech 1212 corresponding to the pertinent Japanese entry word 1211 in the Japanese word dictionary 121.

For details about the morphological analysis, reference is to be made, for example, to the JP-A-6140671.

The syntactic-semantic subroutine 1112 recognizes a semantic structure of the Japanese sentence based on syntactic rules of Japanese and mapping rules of syntactic items onto semantic items. In this processing, there is employed a tree structure in which a plurality of nodes are linked with each other by arcs. For example, a Japanese sentence "watakushi wa tōkyō ni iku" (I go to Tokyo) includes three nodes of "watakushi" (I), "tōkyō" (Tokyo), and "iku" (go). In the analysis, arcs labeled as agent and goal are drawn from the node of "watakushi" and the node of "tōkyō" to the node of "iku" respectively, thereby creating an analysis result. In other words, the syntactic-semantic analysis subroutine 1112 outputs a Japanese sentence analysis result in the form of a network wherein content words (such as a noun, a verb, and an adjective representing respective concepts) are expressed with nodes connected to each other by arcs expressing semantic relationships.

Furthermore, the processing of the syntactic-semantic analysis subroutine 1112 will be described in detail.

A Japanese sentence comprises bunsetsu (Japanese phrasal units) of which each phrasal unit positioned at other than the end of the sentence depends on another Japanese phrasal unit appearing thereafter. The bunsetsu dependency structure is restricted as follows: (i) an arrow drawn from a Japanese phrasal unit to another phrasal unit does not intersect another arrow, and, (ii) a Japanese phrasal unit does not govern a plurality of Japanese phrasal units having an identical semantic rule in the bunsetsu dependency relationships. Conforming to the restrictions, the system first determines a bunsetsu dependency structure for the Japanese sentence. Next, based on a sentence pattern of a predicate (designated as 1214 in FIG. 3A) and an optional-case rule, a semantic rule is decided for a noun related to the predicate. The predicate sentence pattern 1214 denotes a rule which establishes, for a case governed by the predicate, a correspondence between a semantic rule and a surface-case marker (kakujoshi in Japanese or a case postposition). For example, for a verb "honyaku suru" (translate), the Japanese word dictionary 121 contains a sentence pattern 1214 comprised with the following items. (agent: "ga" object: "o" initial state: "kara" final state: "ni")

The optional-case rule is adopted for a case for which a correspondence between a semantic rule and a surface-case marker (case postposition) is not associated with the predicate. This rule is described as internal knowledge of the syntactic-semantic analysis subroutine 1112 as follows, for example. An item (instrument: [+instrument] "de") indicates that a Japanese phrasal unit including a noun having a semantic code "instrument" and a case postposition "de" has a semantic rule of "instrument". This processing is a principle of the syntactic-semantic analysis subroutine 1112. For improving the accuracy of analysis, the processing procedures need be much more developed. In this regard, various methods have already been proposed. Any one of such methods may be adopted in the present invention to achieve the objects above.

The occurring word activation subroutine 1113 is a characteristic processing of the present invention. As activation degree information (1215 of FIG. 3A) for a word associated with a node resultant from the Japanese sentence analysis, the system uses, for example, information inversely proportional to a value of time elapsed from a last occurrence of the pertinent word. The longer the elapsed time is, the lower the activation degree of the word is and hence a priority of selection thereof as an equivalent is decreased. Conversely, the activation degree may be designated by information proportional to the elapsed time. Since the sentence numbers are assigned in an ascending order to sentences sequentially inputted to the Japanese-terminal 1, a larger value of the activation degree is assigned to a word occurring later in the processing.

Subsequently, the English sentence generation module 212 will be described in detail.

The English sentence generation module 212 includes, as shown in FIG. 2A, a lexical selection subroutine 2121, a syntactic generation subroutine 2122, and a morphological generation subroutine 2123.

The lexical selection subroutine 2121 determines an English equivalent for a Japanese word corresponding to a node received as a Japanese sentence analysis result from the Japanese-terminal 1. This processing also contains a characteristic feature of the present invention.

The lexical selection subroutine 2121 first refers to the Japanese-English transfer dictionary 222, which ordinarily indicates for a Japanese word a plurality of English equivalent candidates. First, a local structure of the Japanese sentence analysis result is examined to discard words which can not co-occurr with peripheral words. For the remaining equivalent candidates, the English word dictionary 221 is referred to acquire values of activation degree information (2215 of FIG. 3C) assigned to the candidates, thereby selecting a candidate having the largest value. The occurring word activation subroutine 2113 of the English sentence analysis module 211 loads the field of activation degree information 2215 for the English word with a sentence number of an English sentence containing the word. The larger the sentence number of the information is, the more recently the word has been used.

The syntactic generation subroutine 2122 generates a phrase structure from the semantic structure in conformity with mapping and syntactic rules applied to a transformation from semantic items into syntactic items. A skeleton of a sentence is decided by a sentence pattern of predicate (2214 of FIG. 3C). The sentence pattern of predicate 2214 is a rule defining, for a case governed by a predicate, a correspondence between a semantic role and a syntactic role or a surface-case marker (preposition). For example, the English word dictionary 221 contains, for a verb "translate", a sentence pattern 2214 as follows. (agent: subject, object: object, initial state: from, final state: to)

As above, the predicate "translate" governs four cases (i.e. the agent, the object, and the initial and final states).

An optional-case rule is disposed for a case for which a correspondence between a semantic role and a surface-case marker (preposition) does not depend on the predicate. This rule is described as internal knowledge of the syntactic generation subroutine 2122. For example, a rule (instrument with) indicates that the semantic role "instrument" is represented by a preposition "with". In this connection, the contents of the processing above have been described by way of a principle example of the processing of the syntactic generation subroutine 2122. Namely, in order to generate more appropriate sentence structures, the processing is required to be much more developed. Among various methods already proposed for the syntactic generation, any one thereof may be used in the present invention.

In the morphological generation subroutine 2123, words of the terminal nodes of the phase structure generated by the syntactic generation subroutine 2122 are arranged in a sequence. Moreover, this subroutine 2123 creates each word in inflected form associated with information of the number and the tense.

The subroutines constituting the English sentence generation module 212 have been described.

Next, the English sentence analysis module 211 comprises, as shown in FIG. 2B, a morphological analysis subroutine 2111, a syntactic-semantic analysis subroutine 2112, and an occurring word activation subroutine 2113. The construction of the module 211 is quite similar to that of the Japanese sentence analysis module 111.

Moreover, the Japanese sentence generation module 112 includes, as shown in FIG. 2B, the lexical selection subroutine 1121, the syntactic generation subroutine 1122, and the morphological generation subroutine 1123, which are respectively similar to the constituent subroutines of the English sentence generation module 212.

A description will now be given of another embodiment according to the present invention.

(i) First, in the embodiment of FIG. 1, when translating (by the English sentence generation module 212) a sentence of a first language (Japanese) into a second language (english), words appearing in second-language (English) sentence inputted are preferentially selected in the lexical selection; moreover, when translating (by the Japanese sentence generation module 112) a sentence of the second language (English) into the first language (Japanese), words appearing in first-language (Japanese) sentences inputted are preferentially selected in the lexical selection.

However, the preferential selection need not be necessarily accomplished in both of the Japanese-English and English-Japanese translations, namely, the preferential lexical selection may be naturally accomplished in either one thereof. Concretely, in the flowchart of FIG. 2B, it may be possible to omit the occurring word activation subroutine 2113 from the English sentence analysis module 211 such that the lexical selection subroutine 2121 of the module 212 selects equivalents without referencing activation degree information. Alternatively, without changing the English sentence analysis module 211 of FIG. 2B, only the occurring word activation subroutine 1113 may be omitted from the Japanese sentence analysis module 111.

(ii) Incidentally, the translation need not be necessarily conducted in both directions. Namely, it may be possible that the translation is achieved, for example, only in a direction from the first language (e.g. Japanese) into the second language (e.g. English); whereas the translation from the second language into the first language is not achieved such that an inputted original sentence is directly sent to a communication partner. Namely, for example, in the flowchart of FIG. 2, the Japanese sentence generation module 112 is omitted so that the English-terminal 2 sends an inputted sentence directly to the Japanese-terminal 1, which in turn displays the received English sentence.

Figure 4A:
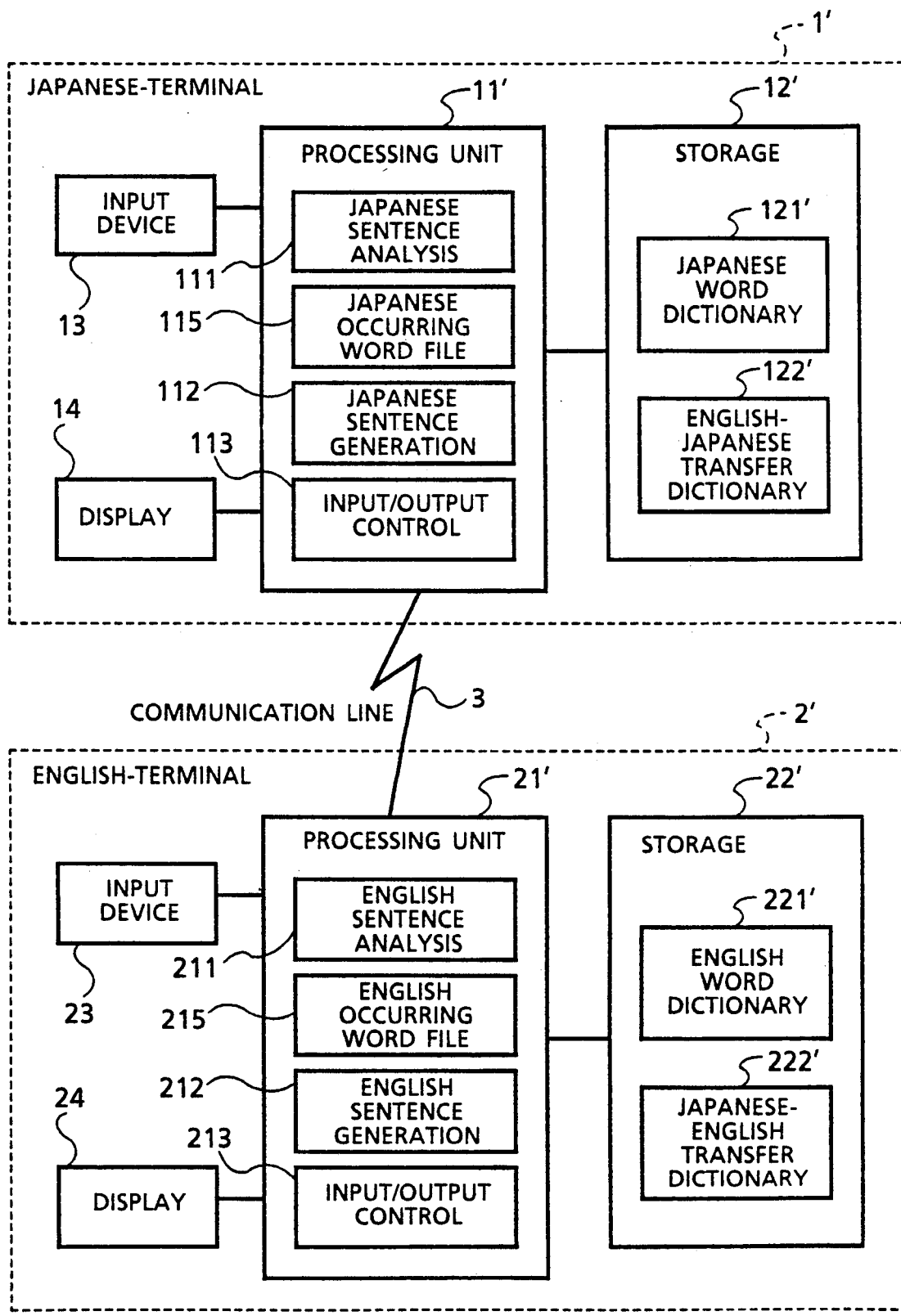
FIGS. 4A and 4B are diagrams schematically showing configurations of translation systems for communication between speakers of different languages in alternative embodiments according to the present invention.

(iii) In the embodiment above, during the lexical selection stage of the Japanese-English translation (or English-Japanese translation), words appearing in English sentences (or Japanese sentences) are preferentially selected. As a consequence, for the words found in the sentences, activation degree information is registered to the English (or Japanese) dictionary such that the preferential lexical selection is accomplished by referencing the activation degree information. However, according to still another embodiment of the present invention, there may be adopted a method in which, as shown in FIG. 4A, without registering activation degree information to the dictionaries, words appearing in English (or Japanese) sentences are stored in an occurring word file. Namely, a memory 115 dedicated to a Japanese occurring word file and a memory 215 to be exclusively used for an English occurring word file are allocated in (or outside) processing units 11' and 21', respectively; or, particular areas of memories beforehand allocated are assigned as occurring word file areas. The words found in the respective input sentences are sequentially registered to the associated file areas such that the contents of these files are referenced in the lexical selection. The lexical selection subroutine selects preferentially the most recently registered one among a plurality of equivalent candidates.

Figure 4B:
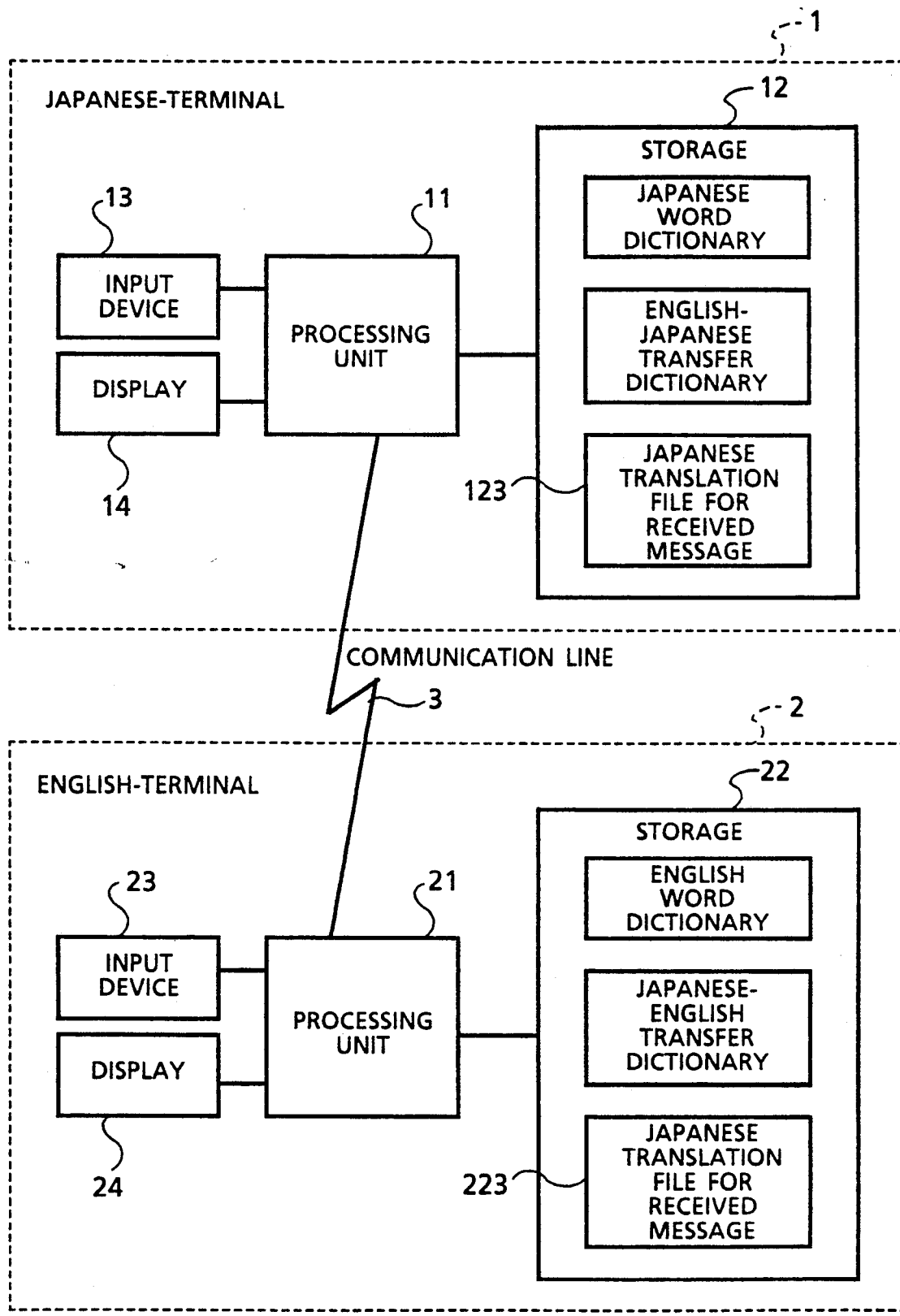

FIG. 4B is a block diagram showing an electronic mail system in an alternative embodiment according to the present invention.

In the embodiment described above, it is assumed that the communication is accomplished through the translation in a realtime fashion. However, like in the case of the electronic mail where the communication is conducted in a non-realtime manner, there are disposed, as shown in FIG. 4B, a Japanese translation file for received message 123 in the storage 12 of the Japanese-terminal 1 and an English translation file for received message 223 in the storage 22 of the English-terminal 2.

In this situation, a translated sentence from the Japanese sentence generation module (112 of FIG. 1) is temporarily stored in the Japanese translation file 123.

In response to a request issued from the input device 13 for a display thereof, the translated sentence is read from the file to be presented on the display 14. Similarly, a translated sentence from the English sentence generation module (212 of FIG. 1) is provisionally stored in the English translation file 223 to be presented later on the display 24 in response to a request from the input device 23 for a display thereof.

Figures 1, 5A:
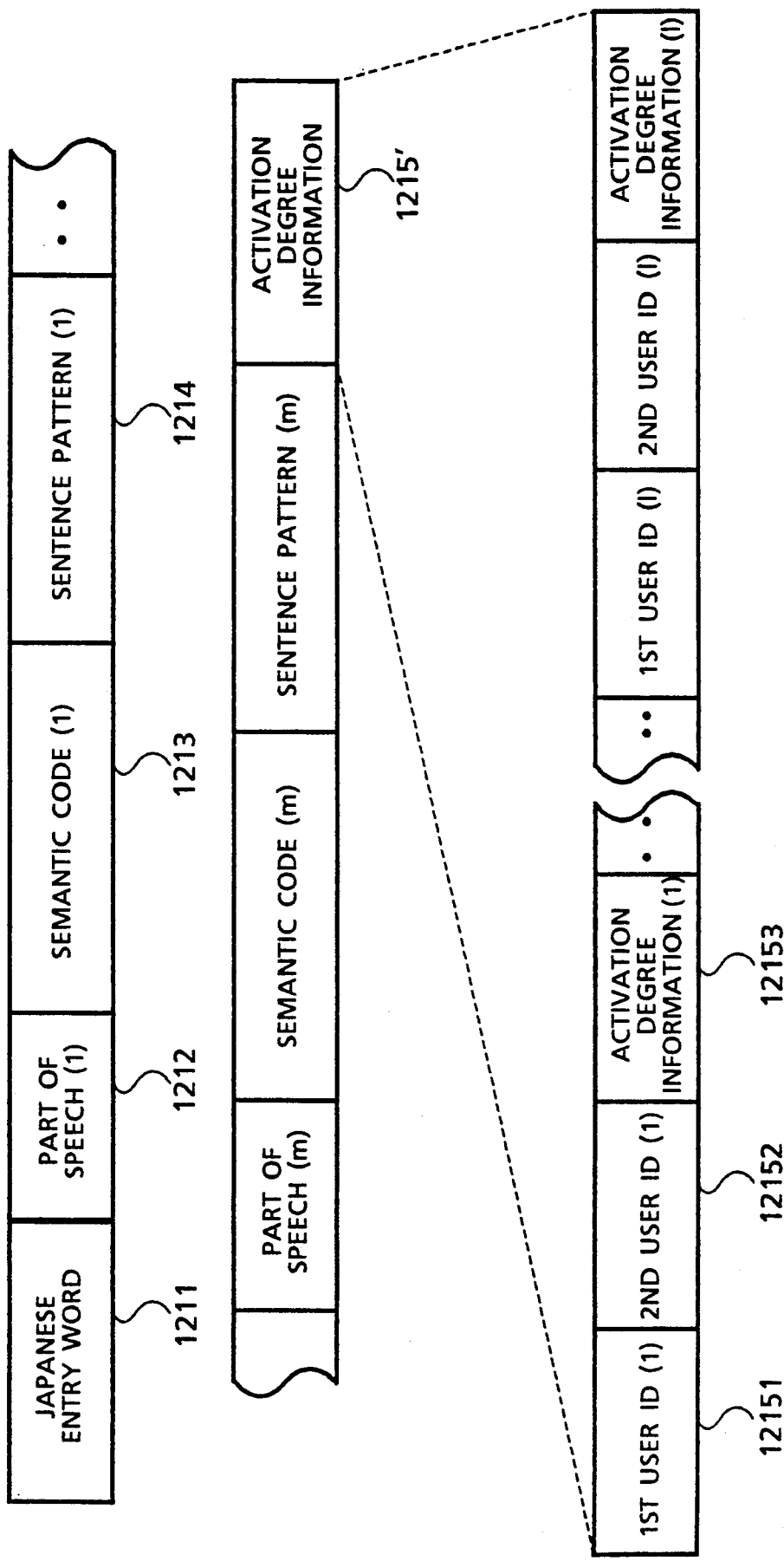
Figures 1, 5B:
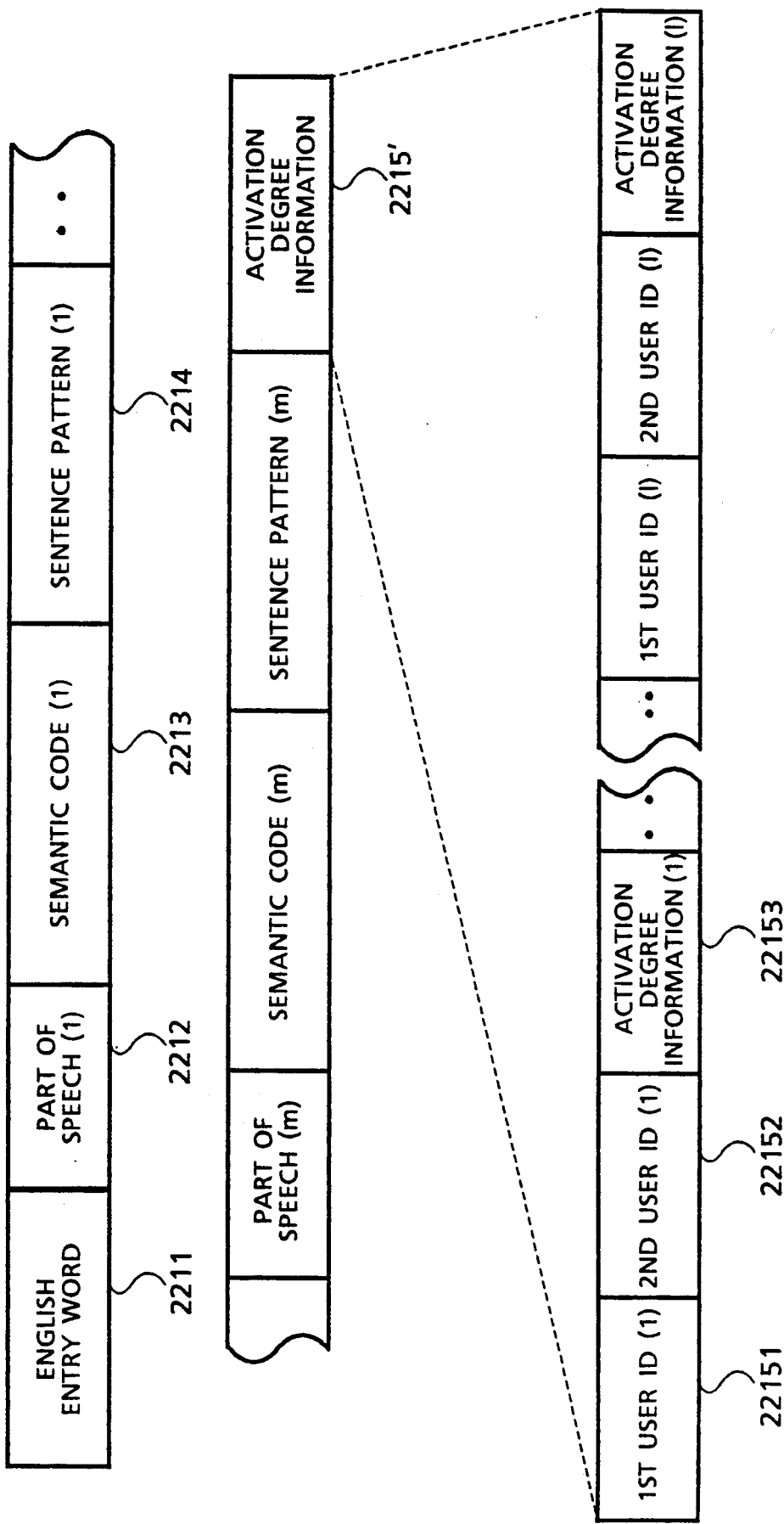

In a case of a system where a number of users communicate with each other in arbitrary combinations thereof, activation degree information is to be disposed for each pair of users. Referring to FIGS. 5A and 5B, the operation will next be described in more detail.

FIGS. 5A and 5B schematically show storage layouts or record formats of activation degree information in another embodiment according to the present invention. In the system of FIG. 4B, as can be seen from FIG. 5A, each record of the Japanese word dictionary (121 of FIG. 1) may be loaded with a plurality of sets of data, each set being constituted with a first user identification (ID) 12151, a second user ID 12152, and activation degree information 12153. Moreover, as shown in FIG. 5B, each record of the English word dictionary (221 of FIG. 1) may be loaded with a plurality of sets of data, each set comprising a first user ID 22151, a second user ID 22152, and activation degree information 22153. As a consequence, the activation degree information fields 12153 and 22153 are disposed together with a pair of user IDs for each entry word. FIGS. 5A-1 and 5B-1 show storage pattern examples thereof.

In the occurring word activation subroutine (1113 of FIG. 2A) of the Japanese sentence analysis module (111 of FIG. 2) executed by the processing unit 11 the activation degree information 12153 for which the first and second user IDs 12151 and 12152 respectively match the receiver and sender IDs is updated. On the other hand, the lexical selection subroutine (1121 of FIG. 2A) of the Japanese sentence generation module (112 of FIG. 2B) achieves a lexical selection by referring to activation degree information 12153 for which the first and second user IDs 12151 and 12152 respectively match the receiver and sender IDs. Similarly, the occurring word activation subroutine (2113 of FIG. 2B) of the English sentence analysis module (211 of FIG. 2B) updates the activation degree information 22153 for which the first and second user IDs 22151 and 22152 are respectively identical to the receiver and sender IDs. On the other hand, the lexical selection subroutine (2121 of FIG. 2) of the English sentence generation module (212 of FIG. 2) carries out a lexical selection by referencing activation degree information 22153 for which the first and second user IDs 12151 and 12152 are respectively identical to the receiver and sender IDs.

Figure 6A:
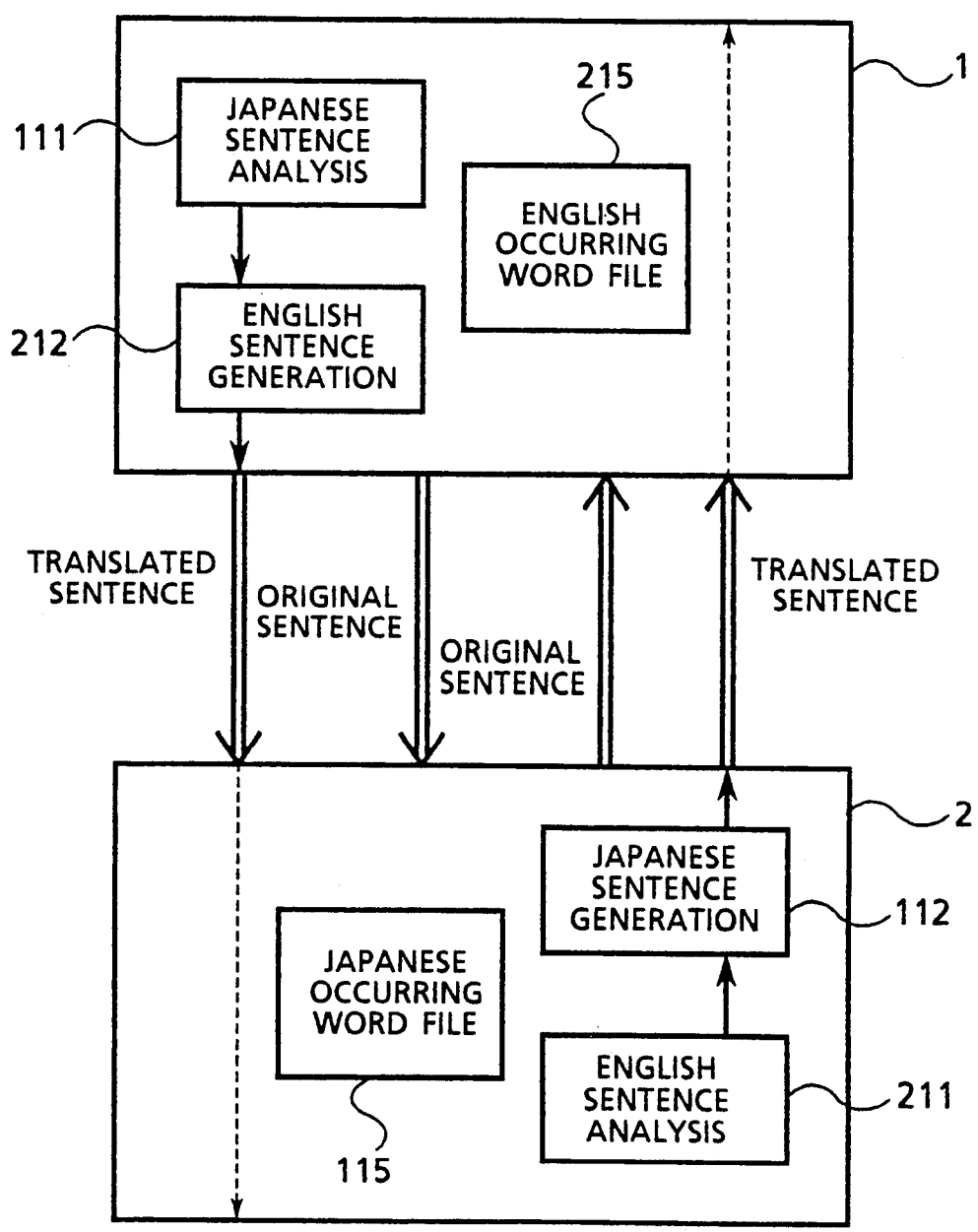
FIGS. 6A to 6C are diagrams showing processing flows and system connections in a variation of the system of FIG. 1.
Figure 6B:
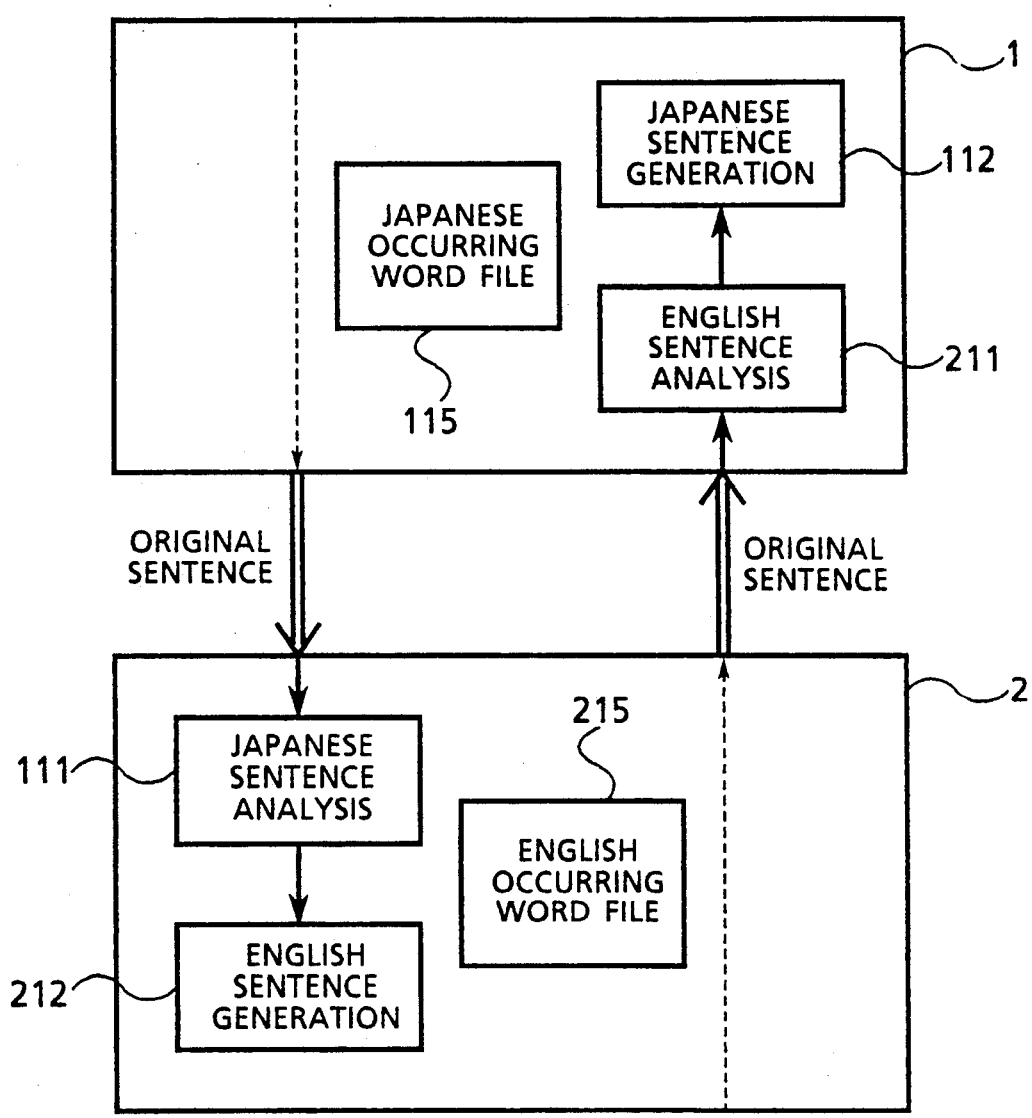
Figure 6C:
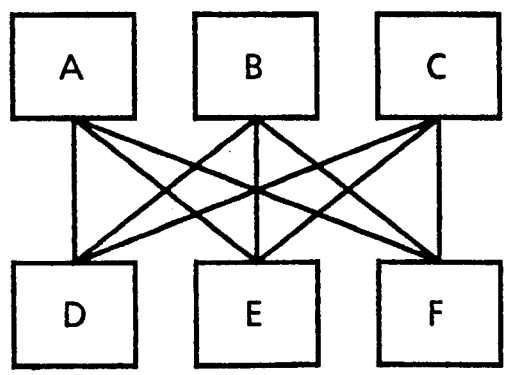

FIGS. 6A to 6C are block diagrams showing further alternative embodiments of a translation system for communication between speakers of different languages according to the present invention.

In the constitution of the embodiment above, as shown in FIGS. 2A and 2B, the Japanese sentence analysis module 111 and the Japanese sentence generation module 112 are executed in the terminal 1 assigned to the speaker of Japanese; whereas the English sentence analysis module 211 and the English sentence generation module 212 are executed in the terminal 2 of an English-language speaker. However, various modifications and variations of the function allocation are possible between the terminals 1 and 2.

In the constitution of FIG. 6A, the Japanese-speaker's terminal 1 conducts the Japanese-English translation by executing the Japanese sentence analysis module 111 and the English sentence generation module 212; whereas the English-speaker's terminal 2 achieves the English-Japanese translation based on the English sentence analysis module 211 and the Japanese sentence generation module 112. Between the terminals 1 and 2, the original sentences are transmitted together with the translated sentences such that the original sentences may be used later for translation in reverse direction.

In the configuration of FIG. 6B, the terminal 1 of the Japanese speaker transmits an original sentence to the terminal 2 of the English speaker so that the terminal 2 performs the Japanese-English translation through execution of the Japanese sentence analysis module 111 and the English sentence generation module 212; whereas the English-terminal 2 sends an original sentence to the Japanese-terminal 1, which then accomplishes the English-Japanese translation by executing the English sentence analysis module 211 and the Japanese sentence generation module 112.

Moreover, as shown in FIG. 6C, in addition to a system including a connection between a Japanese-terminal and an English-terminal, there may be constructed a system in which a plurality of Japanese-terminals A, B, and C are interconnected to a plurality of English-terminals D, E, and F for achieving communications through translations therebetween.

In addition, not only a system employing only two languages but also a system additionally using other languages such as third and fourth languages may be constituted. This communication system can be implemented by combining subsystems which are respectively configured by applying the present invention, for example, to communication systems having the Japanese-German, Japanese-English, Japanese-French, German-English, German-French, and English-French translation functions.

Figure 7:
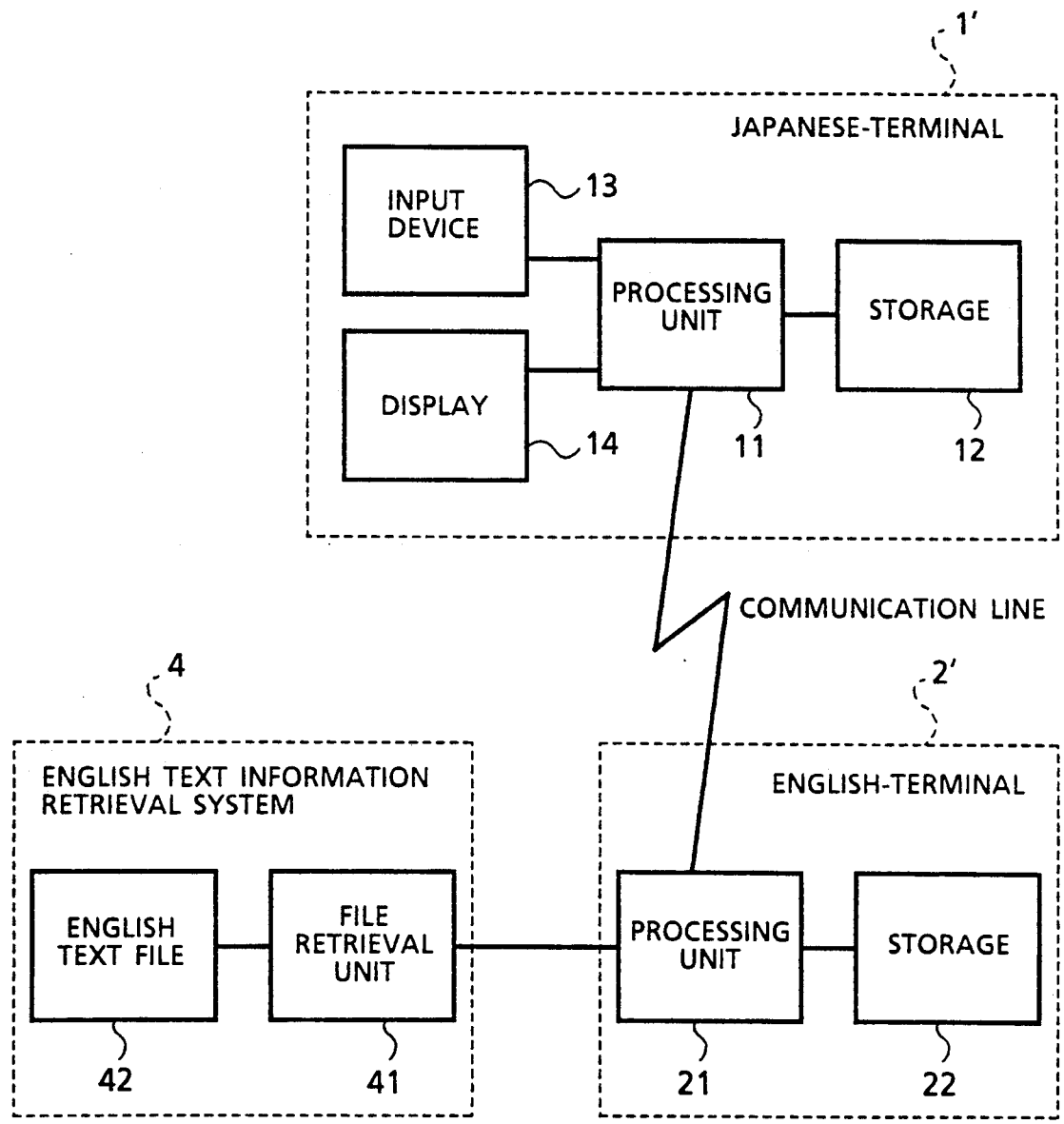
FIG. 7 is a block diagram showing the overall constitution of a Japanese-English information retrieval system in a still another embodiment according to the present invention.

The users on both sides of the communication system with translation function can be, instead of humans, artificial systems each developing a function to respond to an input of a natural language in the same natural language. For example, in a case of communications between a speaker of Japanese and an English text information retrieval system which accepts an enquiry in English and retypes English texts relevant to the enquiry, when the speaker issues an enquiry expressed in Japanese to the retrieval system, the enquiry is translated into English and the retrieved texts are translated into Japanese. FIG. 7 shows the overall constitution of still another embodiment of the Japanese-English information retrieval system according to the present invention.

The constitution of FIG. 7 includes a Japanese-terminal 1', an English-terminal 2', and an English text information retrieval system 4. The Japanese-terminal 1' includes, like the terminal 1 of FIG. 1, an input device 13, a processing unit 11, a storage 12, and a display 14. Moreover, the English terminal 1' comprises only a processing unit 21 and a storage 22, namely, due to absence of a human user in this system, the input/output device used in the system of FIG. 1 can be dispensed with. Furthermore, the English-terminal 2' is connected to the English text information retrieval system 4, which includes a file retrieval unit 41 and an English text file 42.

In operation, the user of the Japanese-terminal 1' first sends a retrieval request in Japanese through the input device 13. The enquiry is translated into English in the Japanese terminal 1' and/or the English terminal 2'. The translated enquiry is passed to the file retrieval unit 41. On receiving the enquiry, the file retrieval unit 41 performs a text retrieval through the English text file 42 to obtain a text relevant to the enquiry. The retrieved English texts are then transmitted from the file retrieval unit 41 to the processing unit 21 of the English terminal 2'. The English texts are translated into Japanese by the English terminal 2' and/or the Japanese terminal 1', thereby presenting the resultant Japanese texts on the display 14.

As many apparently widely different embodiments of the present invention can be made without departing from the spirit and scope thereof, it is to be understood that the invention is not limited to the specific embodiments thereof except as defined in the appended claims.

I claim:

1. A translation method for communication between speakers of different languages in which a first terminal of a first speaker of a first language is connected to a second terminal of a second speaker of a second language for a communication therebetween, the method comprising:
    a first step of inputting a first-language sentence to the first terminal of the first speaker;
    a second step of translating the first-language sentence into the second language;
    a third step of outputting the translated first-language sentence from the second terminal of the second speaker of the second language;
    a fourth step of inputting a second-language sentence to the second terminal of the second speaker;
    a fifth step of translating the second-language sentence into the first language; and
    a sixth step of outputting the translated second-language sentence from the first terminal of the first speaker of the first language, wherein
    the second step includes a substep of determining second-language equivalents for first-language words by preferentially selecting second-language words appearing in the second-language sentence input in the fourth step, and,
    the fifth step includes a substep of determining first-language equivalents for second-language words by preferentially selecting first-language words appearing in the first-language sentence input in the first step.

2. A translation method for communication between speakers of different languages in which a first terminal of first speaker of a first language is connected to a second terminal of a second speaker of a second language for a communication therebetween, the method comprising:
    a first step of inputting a first-language sentence to the first terminal of the first speaker;
    a second step of translating the first-language sentence into the second language;
    a third step of outputting the translated first-language sentence from the second terminal of the second speaker of the second language;
    a fourth step of inputting a second-language sentence to the second terminal of the second speaker;
    a fifth step of translating the second-language sentence into the first language; and
    a sixth step of outputting the translated second-language sentence from the first terminal of the first speaker of the first language, wherein
    the second step includes a substep of determining second-language equivalents for first-language words by preferentially selecting second-language words appearing in the second-language sentence input in the fourth step.

3. A translation method for communication between speakers of different languages in which a first terminal of first speaker of a first language is connected to a second terminal of a second speaker of a second language for a communication therebetween, the method comprising:
    a first step of inputting a first-language sentence to the first terminal of the first speaker;
    a second step of translating the first-language sentence into the second language;
    a third step of outputting the translated first-language sentence from the second terminal of the second speaker of the second language;
    a fourth step of inputting a second-language sentence to the second terminal of the second speaker;
    a fifth step of outputting the second-language sentence from the first terminal of the first speaker of the first language, wherein
    the second step includes a substep of determining second-language equivalents for first-language words by preferentially selecting second-language words appearing in the second sentence input in the fourth step.

4. The method according to claim 1 wherein the system further includes a second-language dictionary containing, for each of the second-language words, in addition to grammatical information and semantic information, activation degree information inversely proportional to a period of time measured from when the second-language word last appeared, wherein:
    said fifth step includes a substep of updating the activation degree information of the second-language words appearing in the second-language sentence input in said fourth step; and
    said second step includes a substep of selecting one of a plurality of candidates which has a highest value of an activation degree designated by the activation degree information when the plurality of second language equivalent candidates exist for a first language word.

5. The method according to claim 1 wherein:
    said fifth step includes a substep of registering second-language words appearing in the second-language sentence input in said fourth step to a second occurring word file disposed to store therein the second-language words appearing in the second-language sentences; and
    said second step includes a substep of selecting one second-language word stored in the second occurring word file when a plurality of second language candidates exist for a first language word.

6. The method according to claim 1, wherein:
    the second language dictionary is provided to describe therein activation degree information for each pair of user identifications (Ids);
    said first and fourth steps include processing for respectively adding a sender ID and a receiver ID to the first- or second-language sentence inputted thereto;

said fifth step includes processing for updating the activation degree information associated with a pair of the receiver ID and the sender ID of the first-language sentence containing the first-language word; and said second step includes processing for selecting a second-language equivalent by referencing the pair of the sender ID and the receiver ID of the second-language sentence.

7. The method according to claim 1, wherein:

a second occurring word file is disposed for each pair of user Ids;

said first and fourth steps include processing for respectively adding a sender ID and a receiver ID to the first or second-language sentence inputted thereto;

said fifth step includes processing for registering the first-language word to the second occurring word file associated with the pair of the receiver ID and the sender ID of the first-language sentence containing the first-language word; and said second step includes processing for selecting second-language equivalent by referencing the second occurring word file associated with the pair of the receiver ID and the sender ID of the second-language sentence.

8. A communication system with a translating function wherein when communicating language information between a first terminal for inputting and for outputting first-language information and a second terminal for inputting and for outputting second-language information, first- and second-language input sentences of said first and second terminals are respectively translated into the second and first languages of associated communicating partners respectively associated with said second and first terminals so as to be respectively transmitted thereto, the system comprising:

first-language information input means disposed in said first terminal for inputting therein first-language information;

second-language information input means disposed in said second terminal for inputting therein second-language information;

first translation means for translating a first-language input sentence into the second-language information;

second translation means for translating a second-language input sentence into the first-language information;

first equivalent selection means for determining a second-language equivalent for a first language word in a first translation by said first translation means by preferentially selecting a second-language word supplied from said second-language information input means;

transmission means for communicating the first- and second-language information between said first and second terminals;

second-language information output means disposed in said second terminal for outputting the first translation result achieved by said first translation means; and first-language information output means disposed in said first terminal for outputting a second translation result accomplished by said second translation means.

9. The system according to claim 8 further including a second equivalent selection means for determining a first-language equivalent for a second language word in the second translation by said second translation means by preferentially selecting a second-language word supplied from said first-language input means.

10. A communication system with a transmitting function comprising:

at least a first terminal of a first speaker of a first language and a second terminal of a second speaker of a second language connected to each other, wherein the first terminal of the first speaker of the first language includes:

a first-language dictionary storing therein first grammatical information and first semantic information of the first language;

a first-language input module for reading therein a first-language sentence;

a first-language analysis module for analyzing the first-language sentence thus read;

a first-language generation module for creating a translated first-language sentence based on a result of analysis conducted on a second-language sentence;

a first-language output module for outputting the translated first-language sentence produced by said first-language generation module, and the second terminal of the second speaker of the second language includes:

a second-language dictionary storing therein second grammatical information and second semantic information of the second language;

a second-language input module for reading therein the second-language sentence;

a second-language analysis module for analyzing the second-language sentence thus read;

a second-language generation module for creating a translated second-language sentence based on a result of analysis conducted by said first-language analysis module on the first-language sentence; and a second-language output module for outputting the translated second-language sentence produced by said second-language generation module, wherein said first terminal of the first-language speaker includes means for transmitting a result of the analysis conducted on the first-language sentence to said second terminal of the second-language speaker, and said second terminal of the second-language speaker includes means for transmitting a result of the analysis conducted on the second-language sentence to said first terminal of the first-language speaker.

11. The system according to claim 10 further comprising:

occurring first language word store means for being used by said first-language generation module for determining a first language equivalent for a second language word during the creation of the translated second-language sentence, thereby enabling said first-language generation module to preferentially select the first-language word already having appeared in the first-language sentence read by said first-language input module; and occurring second-language word store means for being used by said second-language generation module for determining a second equivalent in the second language for a first language word during the creation of the translated first language sentence, thereby enabling said second-language generation module to preferentially select the second language word already having appeared in the second-language sentence read by said second-language input module.

12. The system according to claim 10, wherein
said second-language dictionary contains for each second-language word, in addition to the second grammatical information and the second semantic information, activation degree information inversely proportional to a period of time measured from when the second-language word last appeared or activation degree information described for each pair of sender and receiver terminal identifications Ids;

said second-language analysis module includes means for updating the activation degree information of the second-language word which appears in the second-language sentence thus read or which corresponds to a pair of the receiver ID and the sender ID of the second-language sentence containing the second-language word;

said second-language generation module includes, when a plurality of second-language equivalent candidates exist for a first-language word, means for selecting a candidate therefrom which has a highest activation degree or for referencing activation degree information associated with a pair of the sender ID and the receiver ID of a sentence under a translation, thereby selecting an equivalent for the first-language word; and said first-language and second-language input modules respectively include steps for respectively adding sender IDs and receiver IDs to any sentence inputted thereto.

13. A communication system with a translating function comprising at least one first terminal of a first speaker of a first language and at least one second terminal of a second speaker of a second language, the system comprising:

said first terminal including:
a first-language input module for reading a first language sentence;
a second-language translation module for translating second-language sentences into the first language; and,
a first-language output module for outputting the first language;

said second terminal including:
a second-language input module for reading a second language sentence;
a first-language translation module for translating first-language sentences into the second language; and
a second-language output module for outputting the second language;

arbitrary first terminals of said at least one first terminal including means for selectively transmitting the first-language sentences to arbitrary second terminals of the at least one second terminal;
arbitrary second terminals of said at least one second terminal including means for selectively transmitting the second-language sentences to arbitrary first terminals of said at least one first terminal; and,
a second language dictionary containing, for each second language word, in addition to grammatical information and semantic information, respective activation degree information inversely proportional to a period of time measured from when the each second language-word last occurred; and, wherein said second-language translation module includes means for updating the respective activation degree information in response to every second language word occurring in the second language sentence read by said second language input module; and, wherein said first-language translation module includes means for selecting, among a plurality of second language equivalent candidates possibly stored for a first language word, one of said plurality of candidates which has a highest value of an activation degree designated by the activation degree information.

14. A communication system with a translating function comprising at least one first terminal of a first speaker of a first language and at least one second terminal of a second speaker of a second language, the system comprising:

said first terminal including:
a first-language input module for reading a first-language sentence;
a first occurring word file for storing therein first-language words appearing in the first-language sentence;
a first occurring word registration module for registering occurring first-language words to said first occurring word file;
a second-language translation module for translating second-language sentences into the first language; and,
a first-language output module for outputting the first language;

said second terminal including:
a second-language input module for reading a second-language sentence;
a second occurring word file for storing therein second-language words appearing in the second-language sentence;
a second occurring word registration module for registering occurring second-language words to said second occurring word file;
a first-language translation module for translating first-language sentences into the second language; and
a second-language output module for outputting the second language;

arbitrary first terminals of said at least one first terminal including means for selectively transmitting the first-language sentences to arbitrary second terminals of said at least one second terminal; and,
arbitrary second terminals of said at least one second terminal including means for selectively transmitting the second-language sentences to arbitrary first terminals of said at least one first terminal;
wherein said first-language translation module includes means for selecting one second-language word stored in the second occurring word file when a plurality of second languages candidates exist for one first language word.

15. The communication system according to claim 13 wherein said first-languages input module and said second-language input module includes respective processing means for adding a sender ID and a receiver ID to the first- and second-language sentences read respectively;

wherein said second language dictionary includes means for writing therein the activation degree information for each different pair of the sender and the receiver IDs;

wherein said second-language translation module includes means for updating the activation degree information associated with the pair of the sender and receiver IDs of the second-language sentence containing the respective second-language word; and wherein said first-language translation module includes means for selecting a second-language equivalent by referring to the pair of the receiver and the sender IDs of the first language sentence.

16. A communication system with a translating function comprising at least one first terminal of a first speaker of a first language and at least one second terminal of a second speaker of a second language, the system comprising:

said first terminal including:
- a first-language input module for reading a first-language sentence;
- a first occurring word file for storing therein first-language words appearing in the first-language sentence;
- a first occurring word registration module for registering occurring first-language words to said first occurring word file;
- a second-language translation module for translating second-language sentences into the first language; and,
- a first-language output module for outputting the first language;

said second terminal including:
- a second-language input module for reading a second-language sentence;
- a second occurring word file for storing therein second-language words appearing in the second-language sentence;
- a second occurring word registration module for registering occurring second-language words to said second occurring word file;
- a first-language translation module for translating first-language sentences into the second language; and,
- a second-language output module for outputting the second language;

arbitrary first terminals of said at least one first terminal including means for selectively transmitting the first-language sentences to arbitrary second terminals of said at least one second terminal; and, arbitrary second terminals of said at least one second terminal including means for selectively transmitting the second-language sentences to arbitrary second terminals of said at least one first terminal;

wherein said first-language input module and said second-language input module include respective processing means for adding a sender ID and a receiver ID to the first- and the second-language sentences read respectively;

wherein said second occurring file includes file portions each for storing the respective occurring words for each different pair of the sender and receiver IDs;

wherein said second-language translation module includes means for registering the second-language words to the second occurring file portion associated with the pair of the sender and receiver IDs of the second language sentence containing the second-language words; and wherein said first-language translation module includes means for selecting a second-language equivalent by referring to the second occurring word file portion associated with the pair of the receiver and sender ID of the first-language sentence.

17. A communication system with a translating function comprising at least one first terminal of a first speaker of a first language and at least one second terminal of a second speaker of a second language, the system comprising:

said first terminal including:
- a first-language input module for reading a first language sentence;
- a first translation module for translating first-language sentences into the second language; and,
- a first-language output module for outputting the first language;

said second terminal including:
- a second-language input module for reading a second language sentence;
- a second translation module for translating second-language sentences into the first language; and,
- a second-language output module for outputting the second language;

arbitrary first terminals of said at least one first terminal including means for selectively transmitting the first-language sentences and translated sentences thereof in the second language to arbitrary second terminals of the at least one second terminal;

arbitrary second terminals of said at least one second terminal including means for selectively transmitting the second-language sentences and translated sentences thereof in the first language to arbitrary first terminals of said at least one first terminal; and, a second language dictionary containing, for each the second language word, in addition to grammatical information and semantic information, respective activation degree information inversely proportional to a period of time measured from when each second language-word last occurred;

wherein said second translation module includes means for updating the respective activation degree information in response to every second language word occurring in the second language sentence read by said second language input module;

wherein said first translation module includes means for selecting, among a plurality of second language equivalent candidates possibly stored for a first language word, one of said plurality of candidates which has a highest value of an activation degree designated by the activation degree information.

18. A communication system with a translating function comprising at least one first terminal of a first speaker of a first language and at least one second terminal of a speaker of a second language, the system comprising:

said first terminal including:
- a first-language input module for reading a first-language sentence;
- a second-language occurring word file for storing therein second-language words appearing in a second language sentence read by and transmitted from the second terminal;
- a second-language occurring word registration module for registering occurring second-language words to said second-language occurring word file;

a first translation module for translating first language sentences into the second language; and, a first-language output module for outputting the first language;

said second terminal including:

a second-language input module for reading the second language sentence;

a first-language occurring word file for storing therein first-language words appearing in the first language sentence read by and transmitted from the first terminal;

a first-language occurring word registration module for registering occurring first-language words to said first language occurring word file;

a second translation module for translating second-language sentences into the first language; and a second-language output module for outputting the second language;

arbitrary first terminals of said at least one first terminal including means for selectively transmitting the first-language sentences and translated sentences thereof in the second language to arbitrary second terminals of said at least one second terminal; and, arbitrary second terminals of said at least one second terminal including means for selectively transmitting the second-language sentences and translated sentences thereof in the first language to arbitrary first terminals of said at least one first terminal;

wherein said first translation module includes means for selecting one second-language word stored in the second-language occurring word file when a plurality of second language candidates exist for one first language word.

19. The communication system according to claim 17 wherein said first-language input module and said second-language input module includes respective processing means for adding a sender ID and a receiver ID to the first- and second-language sentences read respectively;

wherein said second language dictionary includes means for writing therein the activation degree information for each different pair of the sender and the receiver IDs;

wherein said second translation module includes means for updating the activation degree information associated with the pair of the sender and receiver IDs of the second-language sentence containing the respective second-language word; and, wherein said first translation module includes means for selecting a second-language equivalent by referring to the pair of the receiver and the sender IDs of the first language sentence.

20. A communication system with a translating function comprising at least one first terminal of a first speaker of a first language and at least one second terminal of a second speaker of a second language, the system comprising:

said first terminal including:

a first-language input module for reading a first language sentence;

a second-language occurring word file for storing therein second-language words appearing in a second language sentence read by and transmitted from the second terminal;

a second-language occurring word registration module for registering occurring second-language words to said second-language occurring word file;

a first translation module for translating first-language sentences into the second language; and, a first-language output module for outputting the first language;

said second terminal including:

a second-language input module for reading the second language sentence;

a first occurring word file for storing therein first-language words appearing in the first language sentence read by and transmitted from the first terminal;

a first-language occurring word registration module for registering occurring first-language words to said second-language occurring word file;

a second translation module for translating second-language sentences into the first language; and, a second-language output module for outputting the second language;

arbitrary first terminals of said at least one first terminal including means for selectively transmitting the first-language sentences and translated sentences thereof in the second language to arbitrary second terminals of said at least one second terminal; and, arbitrary second terminals of said at least one second terminal including means for selectively transmitting the second-language sentences and translated sentences thereof in the first language to arbitrary first terminals of said at least one first terminal wherein said first-language input module and said second-language input module include respective processing means for adding a sender ID and a receiver ID to the first- and second-language sentences read respectively;

wherein said second-language occurring file includes file portions each for storing the respective occurring words for each different pair of the sender and receiver IDs;

wherein said second translation module includes means for registering the second-language words to the second-language occurring file portion associated with the pair of the sender and receiver IDs of the second language sentence containing the second-language words; and, wherein said first translation module includes means for selecting second-language equivalent by referring to the second-language occurring word file portion associated with the pair of the receiver an sender ID of the first language sentence.

21. An information retrieval method between different languages comprising:

a first translation step of translating a first-language enquiry into a second-language enquiry;

a retrieval step of achieving a retrieval through a second-language text file for attaining texts relevant to second-language enquiry; and a second translation step of translating the retrieved second-language texts into the first language, wherein said second translation step includes a substep of determining a first-language equivalent for a second language word by preferentially selecting a first-language word used in the first-language enquiry.

22. The method according to claim 2 wherein the system further includes a second-language dictionary containing, for each of the second-language words, in addition to grammatical information and semantic information, activation degree information inversely proportional to a period of time measured from when the second-language word last appeared, wherein:

said fifth step includes a substep of updating the activation degree information of the second-language words appearing in the second-language sentence input in said fourth step; and said second step includes a substep of selecting one of a plurality of candidates which has a highest value of an activation degree designated by the activation degree information when the plurality of second language equivalent candidates exist for a first language word.

23. The method according to claim 2, wherein:

said fifth step includes a substep of registering second-language words appearing in the second-language sentence input in said fourth step to a second occurring word file disposed to store therein the second-language words appearing in the second-language sentences of the second language; and said second step includes a substep of selecting one second-language word stored in the second occurring word file when a plurality of second language candidates exist for a first language word.

* * * * *